United States Patent [19]

Dahl

[11] 3,938,018

[45] Feb. 10, 1976

[54] INDUCTION CHARGING SYSTEM

[76] Inventor: Ernest A. Dahl, 3747 Breaker Drive, Ventura, Calif. 93003

[22] Filed: Sept. 16, 1974

[21] Appl. No.: 506,530

[52] U.S. Cl. .................. 320/2; 320/39; 336/225
[51] Int. Cl.² ........................................ H02J 7/10
[58] Field of Search ............ 320/2, 39, 40, DIG. 1, 320/DIG. 2, 13; 336/110, 115, 118, 510, 225, 233, DIG. 2

[56] References Cited
UNITED STATES PATENTS

| | | | |
|---|---|---|---|
| 1,982,689 | 12/1934 | Polydoroff | 336/233 |
| 3,253,596 | 5/1966 | Keller, Jr. | 320/2 UX |
| 3,277,358 | 10/1966 | Nicholl | 320/2 X |
| 3,418,552 | 12/1968 | Holmes | 320/2 |
| 3,454,012 | 7/1969 | Raddi | 320/39 X |
| 3,652,915 | 3/1972 | Eberts | 320/35 |
| 3,673,485 | 6/1972 | Vital et al. | 320/2 |

Primary Examiner—J. D. Miller
Assistant Examiner—Robert J. Hickey
Attorney, Agent, or Firm—Ralph B. Pastoriza

[57] ABSTRACT

A normal 117-volt, 60 cycle source is converted into a high frequency signal resulting in radiation of a substantial portion of the energy in the signal. A receiving coil is inductively coupled to the radiation over a given distance substantially less than a wave length of the high frequency signal to provide a received signal without the necessity of any electrical wires. The received signal in turn is converted into a D.C. signal and passed to a rechargeable battery for charging. The inductive coupling can be utilized for recharging portable electrical instruments having rechargeable batteries or for charging larger rechargeable batteries such as used in electrically driven vehicles.

4 Claims, 2 Drawing Figures

INDUCTION CHARGING SYSTEM

This invention relates generally to battery charging systems and more particularly to an improved method and apparatus for recharging batteries without the necessity of any physical conductors extending between a charging source and the battery.

BACKGROUND OF THE INVENTION

Normal charging of batteries either in portable electrical devices such as electric shavers, mini calculators, and the like, or in larger applications such as electric golf carts or electrically driven automobiles, is accomplished by connecting a D.C. charging source directly with wires to the batteries involved. The source of charging current may be derived from a conventional 117-volt, 60 cycle source by rectification.

In all such prior art charging systems, a direct connection has been used. Thus, in the case of portable electrical devices, it is necessary for a user to plug in or connect wires from the charging unit directly to the device and when the charging is complete to effect a physical disconnection. For the case of larger applications, such as golf carts or electrically driven vehicles, the device itself must be kept stationary and an electrical line plugged into suitable receiving terminals connected to the battery to be charged.

BRIEF DESCRIPTION OF THE PRESENT INVENTION

The present invention contemplates a battery charging system working on the principle of induction coupling to the end that no physical wires need be involved between the charging source and battery to be charged. With this arrangement, the electrical device in the case of portable units can simply be automatically charged when placed in its normal place of temporary storage without the operator having to worry about plugging or unplugging various connections. In the case of electrically driven vehicles, charging of the batteries therein can be accomplished again without any physical connection of wires and in certain embodiments, while the vehicle itself is in motion.

Briefly, the method of the invention contemplates the steps of converting a normal 117-volt, 60 cycle source to a higher frequency A.C. signal resulting in radiation of a substantial portion of the energy in the signal; inductively coupling to the radiation field over a given distance substantially less than a wave length of the higher frequency signal to provide a received signal; converting this received signal into a D.C. signal; and passing the D.C. signal to the battery to charge the same.

The preferred apparatus includes an oscillator means for connection to the charging source for converting the source into a signal of given high frequency and a transmitting coil means connected to the output of the oscillator means for radiating the signal. A receiving coil means incorporated either in an adapter arranged to be permanently connected to a portable electrical device or in an electrically driven vehicle is strategically positioned for inductive coupling over a given distance with the transmitting coil means. An A.C. to D.C. converter means is connected between the receiving coil means and the battery for converting the inductively received signal into a D.C. charging signal.

BRIEF DESCRIPTION OF THE DRAWINGS

A better understanding of the invention will be had by now referring to the accompanying drawings in which.

DETAILED DESCRIPTION OF THE INVENTION

Figure 1:
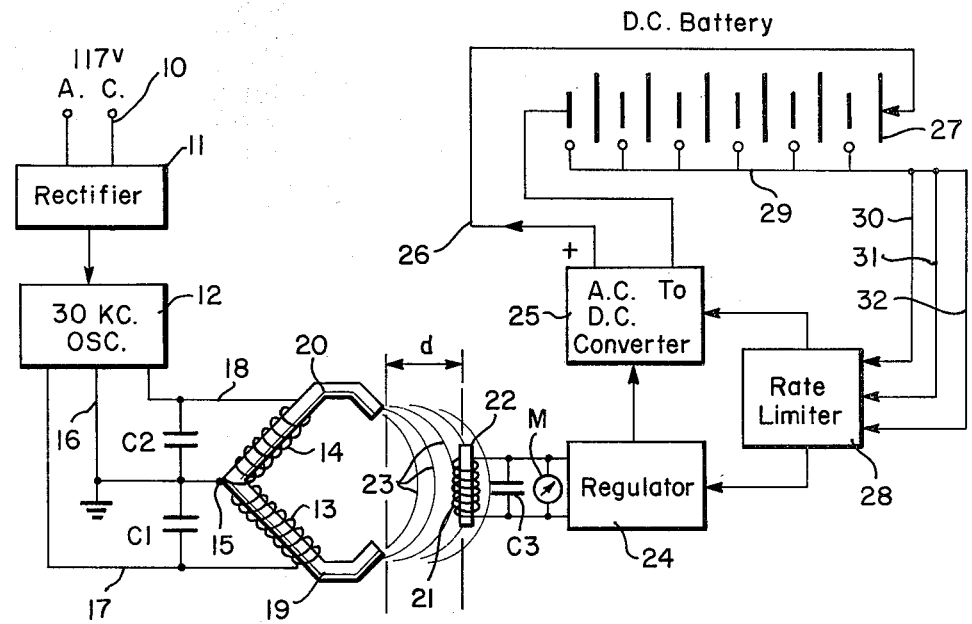
FIG. 1 is a circuit diagram partly in block form illustrating the basic components making up a battery charging apparatus in accord with the present invention.

Referring first to FIG. 1, there is shown in the upper left portion a conventional 117-volt, 60 cycle source 10 connected to a rectifier 11 for driving an oscillator 12. By way of example, the oscillator 12 provides a high frequency A.C. signal of, for example, 30,000 cycles per second. However, the high frequency signal may vary from 10,000 to 40,000 cycles per second or even higher or lower frequency values depending upon the specific application.

A transmitting coil means takes the form in the particular embodiment illustrated of first and second coils 13 and 14 connected together at first ends as at 15 to a common connection 16 from the oscillator 12. The outer ends of the coils 13 and 14 in turn connect to the output leads 17 and 18 of the oscillator to provide a two-phase transmitter. As shown, the coils include powdered iron cores 19 and 20 disposed at an angle to each other to direct the path of the generated electromagnetic field in a desired manner. A single phase transmitter could be used.

Shown spaced a given distance $d$ from the transmitting coil means is a receiving coil means 21 which may also include a powdered iron core 22. The positioning is such as to provide for maximum flux coupling of the electromagnetic field 23 provided from the angular arrangement of the transmitting coil means over the given distance $d$. Preferably, both the transmitting coil means and receiving coil means may be resonantly tuned to the given high frequency by capacitors C1, C2 and by capacitor C3, respectively. The distance d is substantially less than one wave length of the given high frequency radiation so that inductive coupling ensues.

A meter M may be connected across the receiving coil means 21 to provide a visual indication of the degree of coupling.

As shown, the receiving coil means 22 connects to a regulator 24 in turn connecting to an A.C. to D.C. converter means 25. The A.C. to D.C. converter 25 provides a D.C. charging signal on line 26 to the rechargeable D.C. battery designated 27 which may constitute the rechargeable battery in either a portable type device or in an electrically driven vehicle.

The arrangement is such that charging is accomplished with a constant current. The regulator circuit 24 permits charging up to about 80%. The charging signal is then converted to a constant voltage or trickle type charge.

A rate limiter 28 connects between suitable sensor means in the battery 27 as schematically indicated at 29 and the regulator 24 and A.C. to D.C. converter 25. The rate limiter 28 is responsive to the temperature, voltage and gas pressure in the battery 27, these three parameters being provided as indicated schematically on the input lines 30, 31 and 32 to the rate limiter 28.

Figure 2:
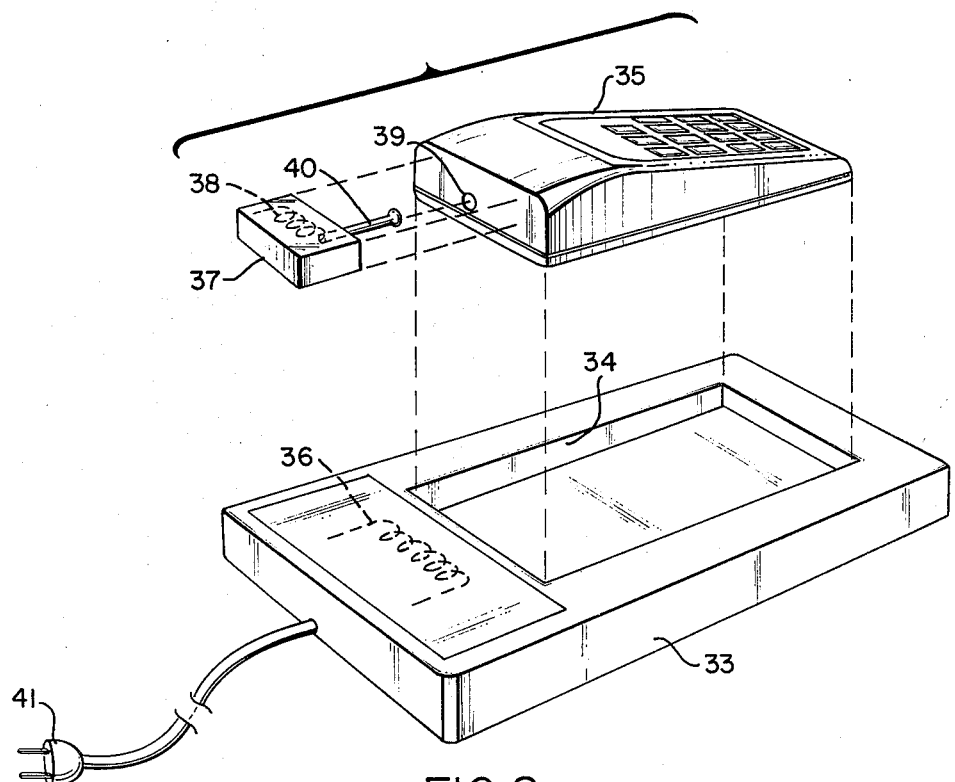
FIG. 2 is an exploded perspective view illustrating an application of the apparatus to the charging of portable electrical devices.

Referring to FIG. 2, there is shown a specific application of the inductive charging system as might be used for a portable electrical device. Thus, there is shown a box structure 33 defining a cavity 34 dimensioned to cradle an electrical device such as a mini-calculator 35 wherein the device 35 incorporates a rechargeable battery.

The oscillator means and transmitting coil means are housed in the box structure 33, the latter being indicated by the dotted lines at 36.

A small adapter casing 37 in turn incorporates the receiving coil means indicated by the phantom lines 38 and also the A.C. to D.C. converter. This adapter casing is arranged to be plugged into the normal inlet charging socket for the mini calculator 35 as indicated at 39 such as by means of the male plug 40. The arrangement is such that when the adapter casing 37 is secured to the portable electrical device 35 and the device itself cradled in the cavity 34 of the housing 33, the receiving coil within the adapter will be in flux coupling relationship with the transmitting coil 36 in the housing 33.

The oscillating means within the housing 33 for the transmitting coil means 36 is energized from a suitable rectifier and plug 41 arranged to be received in a conventional 117-volt, 60 cycle outlet.

OPERATION

In the case of small portable electrical devices such as described in conjunction with FIG. 2, the adapter 37 may be simply plugged into the device itself or the portable device may be manufactured initially with the necessary receiving coil means and A.C. to D.C. converter built in. The transmitting coil and associated oscillator in turn would be provided in a mating base or housing structure such as described at 33 for supporting the portable electrical device when not in use. The arrangement would be such that the transmitting coil means and receiving coil means were spaced relatively close to each other for maximum inductive coupling.

If the portable device is in constant use, it is feasible to maintain the transmitting coil means continuously energized so that every time a user replaces the portable device in its receiving housing, automatic charging of the battery will take place. By utilizing a rate limiter as described in FIG. 1 incorporated in the adapter or the unit itself, overcharging is prevented.

In the case of electrically driven vehicles, the transmitting coil means and associated equipment would be permanently installed at a designated area in various recharging centers analogous to gasoline stations. The driver of the vehicle would then simply position the vehicle over the designated area such that optimum inductive coupling would obtain between the receiving coil means carried in the vehicle and the transmitting coil means at the particular station. The battery of the vehicle could then be charged over a period of time similar to that required to fill a vehicle with gasoline. A simple monitoring system would provide an indication of the amount of charging current used and the vehicle operator could utilize a credit card in the same manner as is presently used in gasoline filling stations.

Since the charging system of the present invention does not require any physical wire connections between the charging source and vehicle battery, the vehicle battery may be charged while the vehicle is in motion. In this respect, a series of transmitting coils could be built into a curb or into special sections along a highway adjacent to which the vehicle would travel and thereby inductively pick up the transmitted radiation while the vehicle is moving.

An important feature of this invention is the provision of a shaped electromagnetic field to optimize coupling between the transmitter and receiver. As shown in the preferred embodiment described this shaped field is provided by angulating the transmitting coils.

It will thus be appreciated from the foregoing that the present invention has provided a unique and valuable improvement in the art of charging rechargeable batteries.

What is claimed is:

1. An apparatus for charging a D.C. rechargeable battery without physical conductors extending between a charging source and said battery, comprising in combination:
   a. oscillator means for connection to said charging source for converting said source into a signal of given high frequency in the range from 10,000 to 40,000 cycles per second;
   b. a transmitting coil means including powdered iron core means connected to the output of said oscillator means for radiating said signal, said transmitting coil means being tuned to said given high frequency;
   c. a receiving coil means including a powdered iron core spaced a given distance from said transmitting coil means substantially less than one wave length of said given high frequency so as to be inductively coupled with said transmitting coil means including first and second coils connected together at first ends to provide a common connection, said coils with their powdered iron core means being disposed at an angle to each other to direct the path of the generated electromagnetic field in a direction for maximum flux coupling with said receiving coil means over said given distance; and
   d. A.C. to D.C. converter means connected between said receiving coil means and said battery for converting the inductively received signal into a D.C. charging signal.

2. An apparatus according to claim 1, including regulating means connected between said receiving coil means and said converting means; and rate limiting means connected to said regulating means and to said converter means and responsive to the temperature, voltage, and gas pressure of said battery to control the D.C. charging current passed to said battery.

3. An apparatus according to claim 1, in which said charging source comprises a 117-volt, 60 cycle source and a rectifier connected between said source and said oscillator means.

4. An apparatus according to claim 1, in which said oscillator means and transmitting coil means are housed in a box structure defining a cavity dimensioned to cradle an electrical device containing said D.C. rechargeable battery; and an adapter casing incorporating said receiving coil means and converter means for connection to said electrical device in a position such that when said electrical device is positioned in said cavity, the receiving coil means is inductively coupled with said transmitting coil means whereby the rechargeable battery in said electrical device is charged.

* * * * *